United States Patent [19] [11] 4,211,567
Dittrich et al. [45] Jul. 8, 1980

[54] PROCESS FOR THE MANUFACTURE OF REFRACTORY CERAMIC PRODUCTS

[75] Inventors: Werner Dittrich, Herten; Walter Josten, Rheinfelden; Heinz Nestler, Niederkassel; Friedhelm Schnippering, Troisdorf, all of Fed. Rep. of Germany

[73] Assignee: Dynamit Nobel Aktiengesellschaft, Troisdorf, Fed. Rep. of Germany

[21] Appl. No.: 919,334

[22] Filed: Jun. 22, 1978

Related U.S. Application Data

[60] Division of Ser. No. 760,060, Jan. 17, 1977, which is a continuation of Ser. No. 326,624, Jan. 26, 1973, abandoned.

[30] Foreign Application Priority Data

Feb. 1, 1972 [DE] Fed. Rep. of Germany ....... 2204531

[51] Int. Cl.$^2$ .............................................. B28B 7/34
[52] U.S. Cl. ................................ 106/38.35; 106/38.3; 164/16; 164/26; 164/35; 264/221; 264/225

[58] Field of Search ................... 106/38.3, 38.35, 38.9; 164/16, 26, 35; 264/225, 221

[56] References Cited

U.S. PATENT DOCUMENTS

| 3,232,771 | 2/1966 | Pearce | 106/38.35 |
| 3,255,025 | 6/1966 | Oxley | 106/38.35 |
| 3,455,368 | 7/1969 | Shepherd | 164/16 |
| 3,537,949 | 3/1970 | Brown et al. | 106/38.9 |
| 3,743,003 | 7/1973 | Brown | 164/16 |
| 3,854,961 | 12/1974 | Flasch | 106/38.3 |

Primary Examiner—Lorenzo B. Hayes
Attorney, Agent, or Firm—Sprung, Felfe, Horn, Lynch & Kramer

[57] ABSTRACT

A ceramic molding composition comprising an alcoholate of aluminum or a metal of the fourth sub-group of the Periodic System, a refractory metal oxide and a polyvalent alcohol, an improvement in the formation of a ceramic product wherein a ceramic molding composition is shaped and hardened, which improvement resides in employing the above defined ceramic molding composition.

10 Claims, No Drawings

PROCESS FOR THE MANUFACTURE OF REFRACTORY CERAMIC PRODUCTS

This is a division of application Ser. No. 760,060 filed Jan. 17, 1977, which, in turn, is a continuation of application Ser. No. 326,624, filed Jan. 26, 1973, now abandoned.

BACKGROUND OF THE INVENTION

1. Field of the Invention

The invention relates to a process for manufacturing refractory ceramic products such as molds and cores for metal casting. The products made by the process of the invention are characterized by an especially high ability to withstand aggressive molten metals.

2. Discussion of the Prior Art

It is known that ceramic molds are made by mixing a finely divided refractory material with a usually siliceous binding agent. By such prior art methods the refractory particles are mixed with the binding agent and applied to a model by immersion, spraying or pouring. Such molds are hardened by drying or by the use of a liquid, solid or gaseous hardener such as ammonia, the liquid binding agent being transformed to a gel and the particles of refractory material being cemented together. When siliceous binding agents are used, a silica gel forms, which is transformed to silicon dioxide in the firing operation that follows.

Molds and cores made by these known methods, however, do not always produce satisfactory results. Particularly in the casting of types of steel having a relatively high carbon content or types having a high chromium content, reactions often occur between the molten metal and the mold, so that the castings have flawed surfaces.

The use of aluminum alcoholates or alcoholates of metals of the fourth sub-group of the Periodic System in the prior art methods used for the production of ceramic molds has hitherto been impossible owing to the great sensitivity of these compounds to moisture. These alcoholates condense partially, as a result of hydrolysis, with the atmospheric moisture to form products of higher molecular weight which can no longer be used as binding agents. The end product of the condensation reaction is always the corresponding oxide.

It has, therefore, become desirable to provide a ceramic molding composition which can readily be formed to a desired shape and hardened, which ceramic composition is relatively insensitive to water. Moreover, it has become desirable to provide a ceramic molding composition which is substantially free of silica or siliceous materials so that the resultant hardened ceramic object is free from surface defects.

SUMMARY OF THE INVENTION

Broadly speaking, this invention contemplates a ceramic molding composition comprising:

A. An alcoholate of aluminum or metal of the fourth subgroup of the Periodic System;
B. A refractory metal oxide; and
C. An agent selected from the group consisting of:
(1) a beta-diketone of the formula

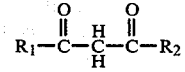

wherein $R_1$ and $R_2$ are each independently an aliphatic radical of between $C_1$ and $C_{18}$ carbon atoms, substituted or unsubstituted, or an aromatic radical of between $C_6$ and $C_{18}$, either substituted or unsubstituted;

(2) a hydroxycarboxylic acid compound of the formula

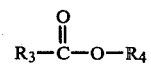

wherein $R_3$ is an aliphatic radical of $C_1$ to $C_{18}$ carbon atoms or an aromatic radical of $C_6$ to $C_{18}$ carbon atoms, either substituted or unsubstituted, and $R_4$ is hydrogen or a substituted or unsubstituted alkyl radical of $C_1$ to $C_4$ carbon atoms; and (3) a polyvalent alcohol.

As indicated above, the present invention is also directed to an improvement in the process for the manufacture of ceramic products wherein a ceramic molding composition is shaped about a form and after being shaped, it is hardened, which improvement comprises employing as the ceramic molding composition the above-defined composition, including one of the agents specified under paragraph C.

It has been found, pursuant to the invention, that beta-diketones, hydroxycarboxylic acids or their lower alkyl esters or polyvalent alcohols render ceramic molding compositions containing alcoholates of aluminum or group 4 metals relatively water insensitive so that the composition can be free of silica and can be resistant to the adverse effects of some materials which may come in contact with the surface of the finished ceramic object, e.g., carbon, chromium and titanium.

The beta-diketones of the present invention generally have the above formula in which $R_1$ and $R_2$ are each independently an aromatic radical or an aliphatic radical, either substituted or unsubstituted. Preferably, $R_1$ and $R_2$ are alkyl radicals, especially of $C_1$ to $C_8$ carbon atoms, e.g., methyl, ethyl, propyl, isopropyl, butyl, isobutyl, pentyl and hexyl. They can also be aryl radicals, such as phenyl, naphthyl, anthracyl and phenanthryl.

Instead of employing a beta-diketone, the ceramic composition can contain, as the agent which renders the composition less water sensitive, a hydroxycarboxylic acid or a lower alkyl ester thereof. Generally speaking, the hydroxycarboxylic compound will have the formula expressed in C.(2) above. $R_4$ will be hydrogen or an alkyl radical generally of $C_1$ to $C_4$ carbon atoms. $R_3$, on the other hand, can be alkyl, cycloalkyl, alkenyl, aralkyl, or heterocyclic. If straight chained, $R_3$ can have $C_1$ to $C_{18}$ carbon atoms, especially $C_1$ to $C_8$. If cyclic, it can suitably have between 5 and 7 members in the ring, especially between 5 and 6. Additionally, $R_3$ can be an aryl group of $C_1$ to $C_{18}$ carbon atoms. It should be understood that hydroxyl substitution on the $R_3$ moiety need not be on the alpha carbon atom of the acid. Indeed, the hydroxyl group can be on any $R_3$ carbon atom, no matter how remote from the acid group.

As a third alternative, a polyvalent alcohol can be employed in the ceramic molding composition, which polyvalent alcohol is preferably a polyvalent alcohol of an alkane, an alkene or an alkyne.

Alternatively, aromatic alcohols, especially phenols, can be employed. The hydroxyl groups of the polyvalent alcohol can be in any position with respect to one another. However, it is preferred that the alcohol be a $C_2$ to $C_{12}$ alkanol.

The ceramic molding compositions of the present invention generally have a composition within the following range:

TABLE I

| Component | Name | Broad % by wt. | Preferred % by wt. |
|---|---|---|---|
| A | Alcoholate of Aluminum or Group 4 Metal | 9 to 45 | 20 to 25 |
| B | Refractory Metal Oxide | 50 to 90 | 72.5 to 78 |
| C | Beta-Ketone; Hydroxycarboxylic Acid or Ester; or Polyvalent Alcohol | 1 to 5 | 2 to 2.5 |

Preferably, the refractory metal oxide has a particle size between 0.1 and 70 microns.

DESCRIPTION OF SPECIFIC EMBODIMENTS

A process has now been found for the manufacture of ceramic products through the mixing of refractory oxides with a binding agent, followed by shaping and hardening, which is characterized in that the binding agent is a mixture of aluminum alcoholate and/or alcoholates of metals of the fourth sub-group of the Periodic System formed with beta-diketones and/or hydroxycarboxylic acids or their esters and/or polyvalent alcohols.

The sensitivity to moisture of the binding agents of the invention is so diminished by the addition of beta-diketones and/or hydroxycarboxylic acids or their esters and/or polyvalent alcohols that they can be used in known processes instead of siliceous binding agents. Any slight condensation that might occur, resulting in dimeric or trimeric condensation products, does not interfere with their use as binding agents.

The binding agents of the invention are to be in liquid form at room temperature, insofar as possible. The metal alcoholate components are alcoholates of $C_1$ to $C_8$ carbon atoms, especially of alkanols, and are preferably the propylates and butylates of the above-mentioned metals. However, those alcoholates of these metals may also be used whose alcohol component is an aliphatic alcohol of 1 to 8 carbon atoms, providing the corresponding metal alcoholates are in liquid form at room temperature.

The second component present in the binding agent of the invention in addition to the metal alcoholates should, insofar as possible, also be a compound that is liquid at room temperature. In many cases this second component reacts with the metal alcoholates to form chelates or other such complex compounds. Such a reaction product can also be added in previously finished form to a batch of binding agent.

The quantity of this second component is to be selected such that when mixed with the metal alcoholate it does not result in the precipitation of solids in the binding agent. By varying these additives the speed of the hydrolysis of the binding agent may be adjusted as required. Amounts of between 2% and 25% of the weight of the metal alcoholate may preferably be used, although the use of larger amounts is possible.

Both aliphatic and aromatic diketones or mixed aliphatic and aromatic diketones may be used as beta-diketones. The following are examples: acetylacetone, acetic acid ester, benzoylacetone or dibenzoylmethane.

The hydroxycarboxylic acids which can be used as the second component are preferably liquid aliphatic hydroxycarboxylic acids. These acids can contain either one or a plurality of hydroxy groups. Examples are glycolic acid, lactic acid or oxypropionic acid, as well as alkyl esters thereof. The alkyl radical of the esters is preferably one having 1 to 4 carbon atoms. Higher hydroxycarboxylic acids or their alkyl esters may also be used, examples being ω-oxycapronic acid or ω-oxycaprylic acid ethyl ester.

The polyvalent alcohols are both bivalent and trivalent and higher-valency alcohols. The position of the hydroxy groups in relation to one another is of no importance. Of the bivalent alcohols, the glycols with 2 to 12 carbon atoms are prefferred, such as ethylene glycol, 1,4-butanediol, hexylene glycol or octylene glycol; however, diglycols may be used, such as ethylene diglycol or propylene diglycol. Also usable as bivalent alcohols are the dialkanolamines, especially di($C_1$–$C_5$) alkanolamines such as diethanolamine. Examples of trivalent alcohols are glycerine and triethanolamine.

The binding agents of the invention can be used both directly and dissolved in a solvent. The addition of a solvent has the advantage that in this manner the concentration of the alcoholates contained in the binding agent can be adjusted, and hence, the amount of metal oxide that is precipitated in the entire body after the hardening of the latter can be controlled. The use of a solvent is recommendable also when the second component of the binding agent of the invention is not liquid at room temperature, such as 1,8-octylene glycol, for example.

Alcohols, ketones, ethers and aliphatic and aromatic hydrocarbons are suitable solvents. In the selection of the solvent, however, care must be taken to see that the solvent does not have the ability to dissolve any wax model that might be used in making the mold. Examples of suitable solvents are isopropyl alcohol, butanone, methylisobutylketone, dioxane, toluene, xylene and benzene. Generally, the binding agent comprises the metal alcoholate and agent, e.g., beta-diketone is present in the solution in an amount between 2 and 25% by weight.

The preparation of the molds with the binding agent of the invention is performed in a conventional manner by mixing the binding agent with the refractory oxides. Since the molds made with these binding agents are attacked only lightly or not at all by high alloy types of steel, such as carbon steel, or steels containing high percentages of chromium, or even by aggressive metals, such as titanium, they are preferentially suitable as expendable molds in the casting of these metals. The refractory oxides used in molds for these metals are to contain less than 10% by weight $SiO_2$, preferably no silica, since the latter can react with the metals at the high temperatures prevailing during the casting.

The refractory oxides which can be used with the aid of the binding agent of the invention to make caramic products with high resistance to aggressive molten metals therefore include preferably corundum, especially alpha alumina as well as other forms thereof; magnesia, $TiO_2$, $ZrO_2$, $ThO_2$, $CaO$, $BeO$ and $Cr_2O_3$.

The molding preparations made with the binding agent of the invention may also be combined with molding compounds which contain binding agents of the prior art, for example, in the case of fine molds made from models that can be removed by melting them out, by making the first two layers of the ceramic mold of a molding compound with the binding agent of the invention, the rest of the layers being made of molding compounds using binding agents of the prior art such as silicates.

In order to more fully illustrate the invention and the manner of practicing the same, the following Examples are presented:

EXAMPLE 1

100 parts by weight of aluminum-sec.-butylate are mixed with 30 weight-parts of acetyl acetone and 30 weight-parts of butanone, a slight warming taking place.

Then 320 weight-parts of fused corundum, finely ground, maximim grain size 0.07 mm, are added. The mixture produces a dipping compound from which any desired investment can be made by drying and hardening. Then models of wax or polystyrene or urea or other such material are dipped and after dipping are sprinkled with finely granular corundum of a grain size of 0.12 to 0.25 mm. After dipping and sanding, the coating is hardened in the air or it is sprayed for more rapid hardening with a hardener fluid of the prior art. The hardener fluid consists, for example, of a mixture of 1.25% aqueous ammonia and ethyl alcohol in a volume ratio of 1:1.

After the coating has solidified, the dipping is repeated, and the second coating is hardened in the same manner. After the hardening of the second coat, additional coats are applied of materials which are used in known processes, such as fused mullite with hydrolyzed ethyl silicate as the bonding agent. The layers of molding compound made with ethyl silicate as the binding agent may also be hardened with the above-described hardeners or with gaseous ammonia. After the coats are hardened the model is removed by melting, burning or dissolving, and the hollow form resulting is fired at temperatures of over 1000° C. The fired mold is filled with metal while either cold or hot. It is suitable for the casting of high-alloy steel at high casting temperatures.

EXAMPLE 2

100 weight-parts of zirconium-n-butylate are mixed with 10 weight-parts of acetyl acetone, and 275 weight-parts of fused, finely ground zirconium oxide (max. grain size 0.06 mm) are stirred into this mixture.

Two coats of this dipping compound are applied as described in Example 1 and hardened as in Example 1. The other coats consist of the material described in Example 1. In this manner a hollow mold is obtained which is suitable for the casting of metals which have a strong tendency to react with the mold, such as carbon steel, high-percentage chromium steels and titanium.

EXAMPLE 3

Onto a divided mold of plastic, metal or wood, which has been treated with a parting agent, a suspension is sprayed which is composed of the following substances: 85 weight-parts of zirconium-n-propylate, 15 weight-parts of acetic acid ester and 250 weight-parts of zirconium oxide, grain size 0 to 0.06 mm.

The spraying is performed by means of an air spray gun. The sprayed coating is about 0.5 mm thick. Then the coating is dusted with a coarser zirconium oxide. After dusting, a hardener consisting of 1.25% aqueous ammonia and alcohol is sprayed on. After the solidification of the prime coat, a second coat of the same material is applied, or a direct backing is applied with a ceramic compound consisting of a refractory material and a binding agent on a basis of ethyl silicate containing a hardener. This compound is the same as the compounds which are used in the known Shaw process.

After the Shaw compound has set, the model is removed from the molding compound. After post-hardening, flame cleaning and then firing, the mold is ready for the casting. In the molds made by this method castings can be made of high-alloy steels, of high cast weights and with flaw-free surfaces.

EXAMPLE 4

100 weight-parts of tetraisopropyltitanate, 50 weight-parts of triethanolamine and 45 weight-parts of isopropanol are mixed together, and fused magnesia is stirred into the mixture.

With this dipping compound a wax model is invested by dipping it twice. To accelerate hardening the model is sprayed with a water-alcohol mixture. After applying the first two coats, the model is covered with additional ceramic layers containing ethyl silicate as binding agent.

What is claimed is:

1. In a process for the manufacture of a ceramic mold comprising the steps of coating a model with a ceramic molding composition, shaping said composition about said model, hardening said composition removing the model and firing the resulting mold; the improvement comprising a ceramic molding composition, substantially free of silica or siliceous materials consisting essentially of:
   (1) a refractory metal oxide; and
   (2) a non-silicious binding agent which is liquid at room temperature, said binding agent consisting essentially of:
   (A) an uncondensed liquid metal alcoholate of aluminum or a metal of the Fourth Sub-Group of the Periodic System, and
   (B) a liquid polyvalent alcohol, in an amount between 2 and 25% by weight of the metal alcoholate and in such amount that when in admixture with said metal alcoholate precipitation of solids does not occur.

2. A process according to claim 1 wherein said model is removed by melting, burning or dissolving.

3. A process according to claim 1 wherein said alcoholate is an alcoholate of an aliphatic alcohol containing 1 to 8 carbon atoms, said refractory oxide is selected from the group consisting of alumina, titania, zirconia, thoria, calcium oxide, beryllia and chromia, said polyvalent alcohol is an aromatic alcohol or an alkanol containing 2 to 12 carbon atoms and said components are present in the following amounts:

Alcoholate of aluminum or Group IV metal—20 to 25% by weight
Refractory metal oxide—72.5 to 78% by weight
Polyvalent alcohol—2 to 2.5% by weight.

4. A process according to claim 1 wherein said coating and hardening steps are repeated.

5. A process according to claim 4 including the additional step of coating said hardened composition with a refractory composition comprising fused mullite and a 1 to 50% hydrolyzed ethyl silicate, and hardening same with ammonia, ethyl alcohol or a mixture thereof.

6. A process according to claim 1 wherein the ceramic composition is applied to said model by spraying.

7. A process according to claim 1 wherein said polyvalent alcohol contains an alkane, an alkene or an alkyne groups having 2-20 carbon atoms and the alcoholate, refractory metal oxide and polyvalent alcohol are present in the ceramic molding composition in the following range:
Alcoholate of aluminum from Group IV metal—9 to 45% by weight
Refractory metal oxide—50 to 90% by weight
Polyvalent alcohol—1 to 5% by weight.

8. A process according to claim 7 wherein the polyvalent alcohol is selected from the group consisting of 1,4-butanediol, ethyleneglycol, hexylene glycol, octylene glycol, ethylene diglycol, propylene diglycol, diethanolamine, glycerine and triethanolamine.

9. A process according to claim 1 wherein the ceramic molding composition contains a solvent selected from the group consisting of isopropyl alcohol, butenone, methylisobutylketone, dioxane, toluene, xylene and benzene.

10. A ceramic molding composition substantially free of silica or siliceous materials consisting essentially of:
(1) a refractory metal oxide; and
(2) a non-siliceous binding agent which is liquid at room temperature, said binding agent consisting essentially of:
(A) an uncondensed liquid metal alcoholate of aluminum or a metal of the Fourth Sub-Group of the Periodic System and
(B) liquid polyvalent alcohol, in an amount between 2 and 25% by weight of the metal alcoholate and in such amount that when in admixture with said metal alcoholate precipitation of solids does not occur.

* * * * *